US011952202B2

(12) United States Patent
Tadimeti et al.

(10) Patent No.: US 11,952,202 B2
(45) Date of Patent: Apr. 9, 2024

(54) PILL DISPENSER WITH A PRE-FILLED STACKABLE CARTRIDGE

(71) Applicant: Satya Venkat Rao Tadimeti, Riverside, CA (US)

(72) Inventors: Satya Venkat Rao Tadimeti, Riverside, CA (US); Piyush Sakhareliya, Eastvale, CA (US)

(73) Assignee: Satya Venkat Rao Tadimeti, Riverside, CA (US)

( * ) Notice: Subject to any disclaimer, the term of this patent is extended or adjusted under 35 U.S.C. 154(b) by 79 days.

(21) Appl. No.: 17/731,123

(22) Filed: Apr. 27, 2022

(65) Prior Publication Data

US 2023/0348174 A1 Nov. 2, 2023

(51) Int. Cl.
*B65D 83/04* (2006.01)
*A61J 7/00* (2006.01)
*A61J 7/04* (2006.01)

(52) U.S. Cl.
CPC ........ *B65D 83/0454* (2013.01); *A61J 7/0076* (2013.01); *A61J 7/0472* (2013.01); *A61J 2200/70* (2013.01); *A61J 2205/10* (2013.01); *B65D 2203/06* (2013.01); *B65D 2583/0459* (2013.01)

(58) Field of Classification Search
CPC ............ B65D 83/0454; B65D 2203/06; B65D 2583/0459; A61J 7/0076; A61J 7/0472; A61J 2200/70; A61J 2205/10
USPC ........ 206/528, 530, 531, 534–536, 538–540; 221/1, 4
See application file for complete search history.

(56) References Cited

U.S. PATENT DOCUMENTS

| | | | | |
|---|---|---|---|---|
| 3,675,620 A * | 7/1972 | Baustin | A61J 7/04 206/534 |
| 3,911,856 A * | 10/1975 | Ewing | G04B 47/02 206/534 |
| 4,164,301 A * | 8/1979 | Thayer | B65D 83/0454 292/84 |
| 2005/0205458 A1* | 9/2005 | Pearson | B65D 83/04 206/538 |
| 2005/0205595 A1* | 9/2005 | Lepke | G07F 11/54 221/87 |
| 2009/0127157 A1* | 5/2009 | Costa | B65D 83/0409 206/534 |
| 2014/0339249 A1* | 11/2014 | Reddy | G16H 20/13 221/1 |

* cited by examiner

*Primary Examiner* — Luan K Bui
(74) *Attorney, Agent, or Firm* — Mahesh Law Group PC; Kumar Maheshwari

(57) ABSTRACT

The present disclosure relates to the field of a pill dispenser. The pill dispenser with a pre-filled stackable cartridge comprises a top plate, fitted horizontally with an embedded machine device; a cartridge assembly, fitted horizontally and mounted vertically on top of each of the cartridge assembly, detachably supporting a set of the pre-filled stackable cartridge wherein each of the cartridge comprise a plurality of slots to place a pill and a pill dispensing slot for dispensing the pill; and a plurality of tabs attached externally to each of the cartridge wherein one of the tab remains intact and rest each of the tabs are broken to create at least one hole to denote a serial number of the cartridge to follow a sequence of mounting the cartridge, a base plate comprising a pill cup to be manually pulled by the consumer to extract the pill to be consumed.

11 Claims, 13 Drawing Sheets

PILL DISPENSER WITH A PRE-FILLED STACKABLE CARTRIDGE

FIELD

The present disclosure relates to the field of pill dispenser. More specifically, the field relates to a pill dispenser with a pre-filled stackable cartridge.

BACKGROUND OF THE INVENTION

The background information herein below relates to the present disclosure but is not necessarily prior art.

Consumers, especially senior citizen, forget to take pills prescribed by the doctor or the medical practioner. Many times, it happens that consumers take the pills incorrectly and face serious side-affects. Moreover, it becomes cumbersome for filling and emptying the dispenser by the consumer themselves by opening each and every medicine bottle. Sadly, there can be chances that the consumer fills in wrong pill dosage or wrong pill for a particular time of day. Also, there are times when the pills are of the same color and size, so it's very difficult for the consumer to differentiate one pill from another according to the dosage and timing of the pill.

Further disadvantages of pill dispenser are that display is available vertically, for which the consumer has to bend to a particular height, which is difficult for seniors.

There must be an automated way to let the authorized person related to the consumer know whether the pill has been consumed on time or has been wasted.

In addition to above, teenagers find it easier to take pills from pill dispensing machines and consume them as illegal drugs in high dosage.

Therefore, there is a need in the market to provide a pill dispenser with a pre-filled stackable cartridge, which can alleviate the above-mentioned drawbacks and motivate users to respond positively to the content that is displayed.

BRIEF SUMMARY OF THE INVENTION

The present disclosure envisages a pill dispenser with a pre-filled stackable cartridge.

According to a first aspect of the disclosure, a top plate, fitted horizontally with an embedded machine device to provide at least one notification to a consumer and at least one user pertaining to pill consumption.

In accordance with a second aspect of the disclosure there is provided, a cartridge assembly, fitted horizontally and mounted vertically on top of each of the cartridge assembly, detachably supporting a set of the pre-filled stackable cartridge wherein each of the cartridge comprise a pill tray with a plurality of slots to place a pill and a pill dispensing slot for dispensing the pill; and a plurality of tabs attached externally to each of the cartridge wherein one of the tab remains intact and rest each of the tabs are broken to create at least one hole to denote a serial number of the cartridge to follow a sequence of mounting the cartridge.

In accordance with a third aspect of the disclosure, a base plate comprising a pill cup to be manually pulled by the consumer to extract the pill to be consumed.

In accordance with all aspects of the disclosure, the cartridge assembly includes a lock to hold the cartridge in place by interlocking with a L shaped spring on push of the cartridge.

In accordance with the aspects of the disclosure, the cartridge assembly includes a connector configured to provide power and data supply to the pill dispenser; and at least one motor configured to rotate the pill tray to align next filled slot to the pill dispensing slot for the pill to dispense.

In accordance with the aspects of the disclosure, the base plate comprises a plurality of magnets to hold the pill cup and at least one sensor to sense proximity of the pill cup and send a signal to the machine device if the cup is not correctly placed.

In accordance with the aspects of the disclosure, the base plate comprises a gate configured to flip to one side after a pre-determined time to collect the pill by a trash pan.

In accordance with the aspects of the disclosure, the number of the cartridges can be increased or decreased accordingly.

In accordance with the aspects of the disclosure, the pill tray rotates at a pre-determined time to align with the pill dispensing slot.

In accordance with the aspects of the disclosure, the machine device comprises a user interface to facilitate the consumer to provide at least one input to select at least one functionality, an application and a scanning unit.

In accordance with the aspects of the disclosure, the application is configured to provide the notification to the user, and comprises a user interface to facilitate the consumer to provide at least one input to select at least one functionality.

In accordance with the aspects of the disclosure, the scanning unit is configured to scan at least one visual code pasted on a new cartridge to be fitted in the cartridge assembly once the cartridge is ejected.

The present disclosure also envisages aspects relating to a method for operation of a pill dispenser with a pre-filled stackable cartridge.

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a pill dispenser with a pre-filled stackable cartridge.

Another object of the present disclosure is to provide a pill dispenser which is secure, child proof and tamper resistant.

Yet another object of the present disclosure is to provide an automatic tracking of all doses, even upcoming.

Still another object of the present disclosure is to provide medication reminders If required for both consumers and caregivers.

Another object of the present disclosure is to provide a hassle free and an error free device as it is pre-filled by a pharmacist.

Yet another object of the present disclosure is to provide proper management of unused medications.

Still another object of the present disclosure is to provide authenticated verification, to put pre-filled cartridges once the earlier are empty.

Other objects and advantages of the present disclosure will be more apparent from the following description, which is not intended to limit the scope of the present disclosure.

BRIEF DESCRIPTION OF THE ACCOMPANYING DRAWING

A pill dispenser with a pre-filled stackable cartridge, of the present disclosure will now be described with the help of the accompanying drawing, in which:

FIG. 1 illustrates the perspective view of the pill dispenser with a pre-filled stackable cartridge, in accordance with an embodiment of the present disclosure;

FIG. 2*a* illustrates the top view of the lid and side view of the cartridge assembly in FIG. 1, in accordance with an embodiment of the present disclosure;

FIG. 2*b* illustrates the cross-sectional view of the cartridge, in accordance with an embodiment of the present disclosure;

FIG. 3 illustrates the cartridge and the cartridge assembly, in accordance with an embodiment of the present disclosure;

FIG. 4*a* illustrates the side view of the cartridge assembly, in accordance with an embodiment of the present disclosure;

FIG. 4*b* illustrates the partial cross-sectional view of the cartridge assembly, in accordance with an embodiment of the present disclosure;

FIGS. 5*a*-5*b* illustrates the interlocking of the cartridge and the cartridge assembly, in accordance with an embodiment of the present disclosure;

LIST OF REFERENCE NUMERALS

Figure 1:
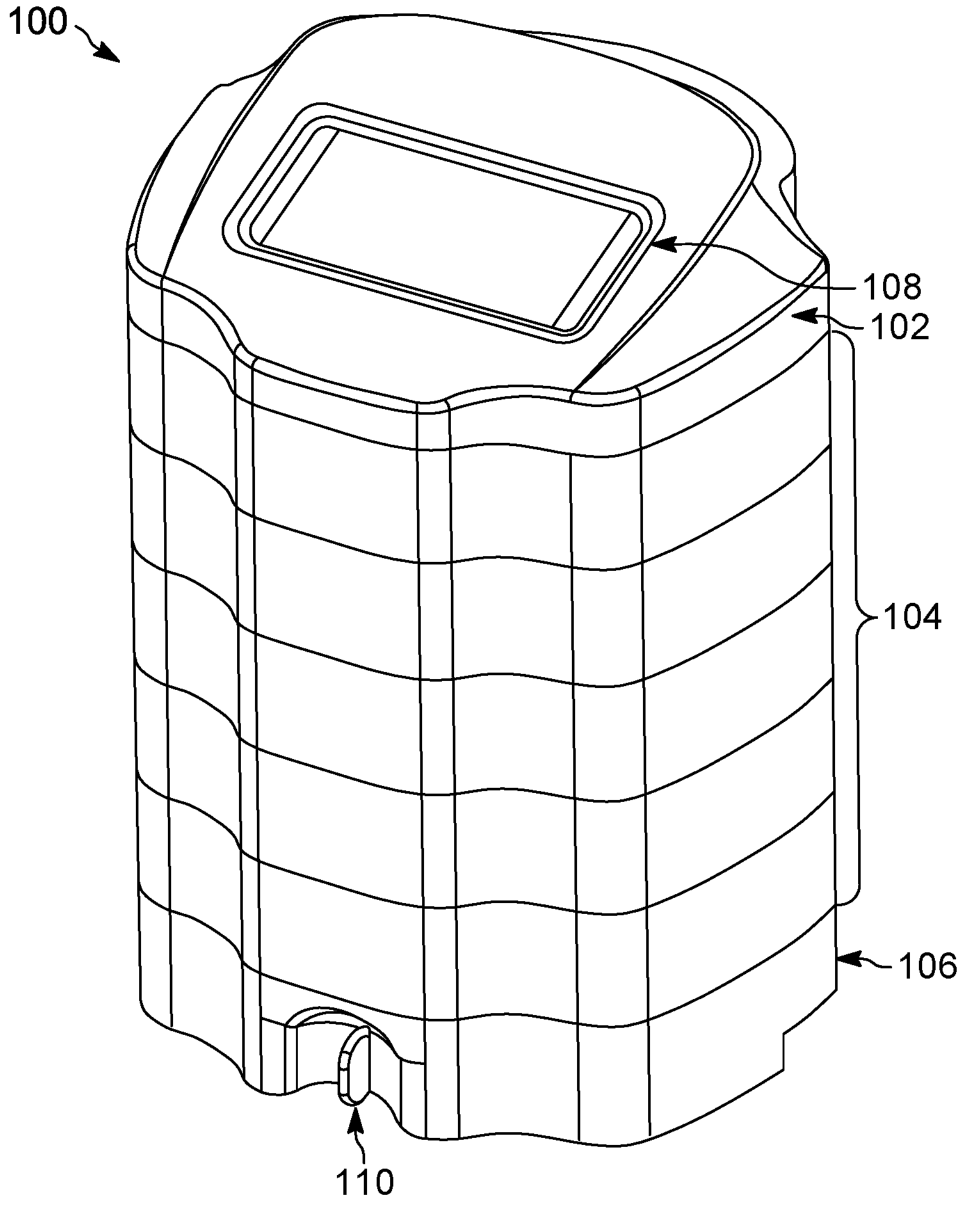

100 pill dispenser
102 top plate
104 set of cartridges
106 base plate
108 machine device
110 pill cup
112 lid
114 pill dispensing slot cover
116 connector
118 grooves
120 cartridge assembly
122 protective tab
124 L shaped spring
126 lock
128 motor
130 slot
132 sensor
134 magnet
136 switch
138 trash pan
140 pill tray
142 pins

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, elements, modules, units and/or components, but do not forbid the presence or addition of one or more other features, elements, components, and/or groups thereof. The particular order of steps disclosed in the method and process of the present disclosure is not to be construed as necessarily requiring their performance as described or illustrated. It is also to be understood that additional or alternative steps may be employed.

Pill dispensers are cumbersome to handle especially when consumers/patients are old or tend to forget easily if they have consumed their pill. Youngsters, on the other hand, find it easy to break open the pill dispenser to have the pills for their own consumption as illegal drugs.

To avoid this, a pill dispenser with a pre-filled stackable cartridge (hereinafter referred to as "pill dispenser 100") and a method for operation of a pill dispenser with a pre-filled stackable cartridge (hereinafter referred to as "method 200"), of the present disclosure is described with reference to FIG. 1 through FIG. 7*c*.

The pharmacist receives the prescription of the consumer for pre-filling of the cartridge 104 directly from the doctor in the form of CSV file. The pharmacist provides the details of the dosages of the consumer, quantity of the pills and days for which the medication is required on the web portal, which automatically gets synced with the pill dispenser 100. As per these details mentioned in the prescription of the consumer, the pharmacist decides the number of cartridges 104 to be pre-filled, that may vary. No additional machinery or equipment is required for pre-filling the pill dispenser. The pharmacist can manually fill in all the slots of the pill tray, stack the cartridge and ready the pill dispenser 100. The pill dispenser is helpful for the consumer even when the pills are of the same color, shape and size. No special segregation of pills or packaging is required, hence the pill dispenser 100 saves money, effort and time.

The pill dispenser 100 (as referred in FIG. 1) is stacked with removable cartridges 104, and the pharmacist provides the authorized signature at the time of shipment to the consumer, this way the consumer gets a hassle-free dispenser pre-stacked with pills stacked in the sequence of the timing of the pills.

The pill dispenser 100 comprises a top plate 102, a set of cartridge assembly 120 and a base plate 106.

The top plate 102 is fitted horizontally with an embedded machine device 108 to provide at least one notification to a consumer and at least one user pertaining to pill consumption.

In an embodiment, the machine device 108 is embedded in the pill dispenser 100 and a user device remotely connected with machine device 108.

The user device is configured to receive timely reminders and notifications pertaining to the pill consumption of the consumer through an application installed in the machine device 108. The machine device 108 comprises a user interface to facilitate the consumer to provide at least one input to select at least one functionality like eject cartridge,
insert cartridge,
SOS button for emergency help, facilitates the consumer to provide log in ID and password for authentication of the consumer for dispensing of the pill, a dispense button to allow pill to dispense, capture time of dispensing the pill, and maintain logs of the captured timing or missed pill.

In an embodiment, the machine device 108 is fitted at an angle that encourage the consumer to have a clear and an easy display without bending or any physical effort. In another embodiment, the user interface is user friendly and has no dial pad for using which at times is cumbersome to use.

The notifications and reminders are selected from the group consisting of an audio, text and a call.

In an embodiment, the notification and reminders are multilingual.

A speaker on the top plate 102 is configured to play the notification and the messages for the consumer. The day and time for these reminders can be pre-set by the consumer, caregiver, family member and a doctor.

Further, the caregiver, doctor, pharmacist, family members can also be added to receive the reminders and notifications.

The set of cartridge assembly 120 is fitted horizontally and mounted vertically on top of each of the cartridge assembly 120, detachably supporting a set of the pre-filled stackable cartridge 104 wherein each of the cartridge 104 comprises a pill tray 140 with a plurality of slots 130 and a plurality of tabs 122.

Figure 2A:
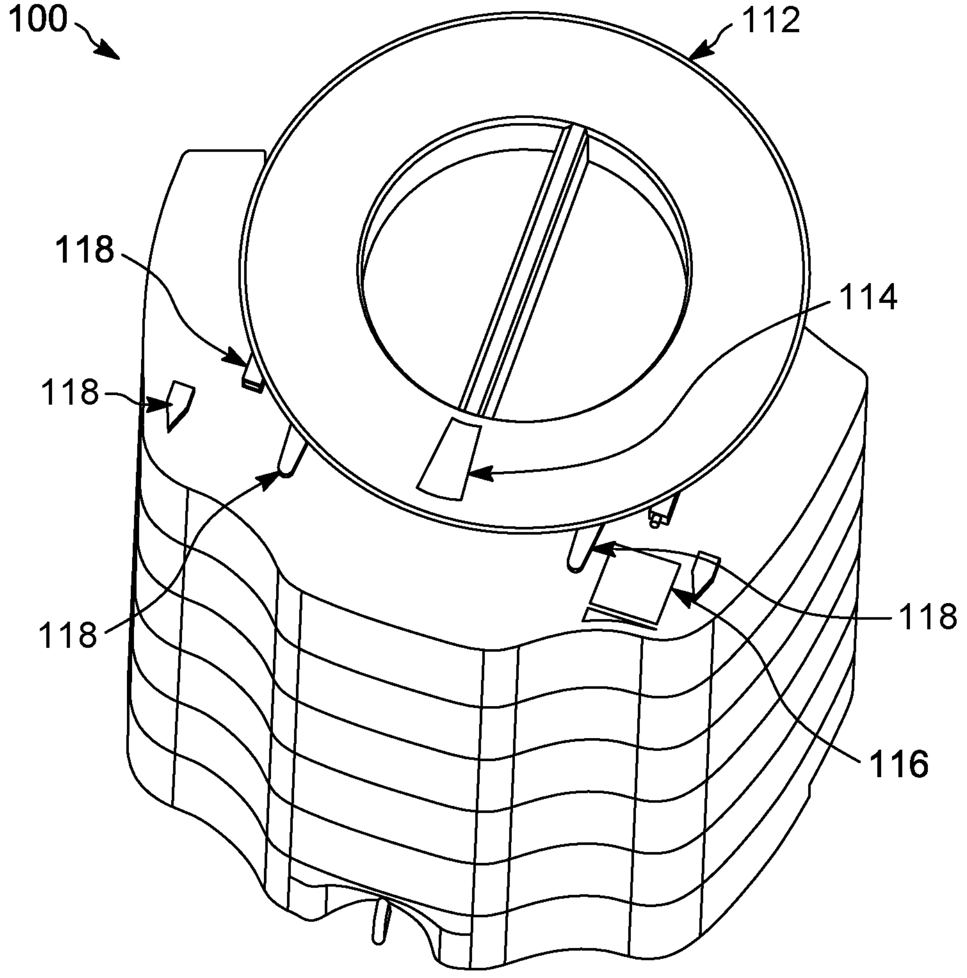
Figure 2B:
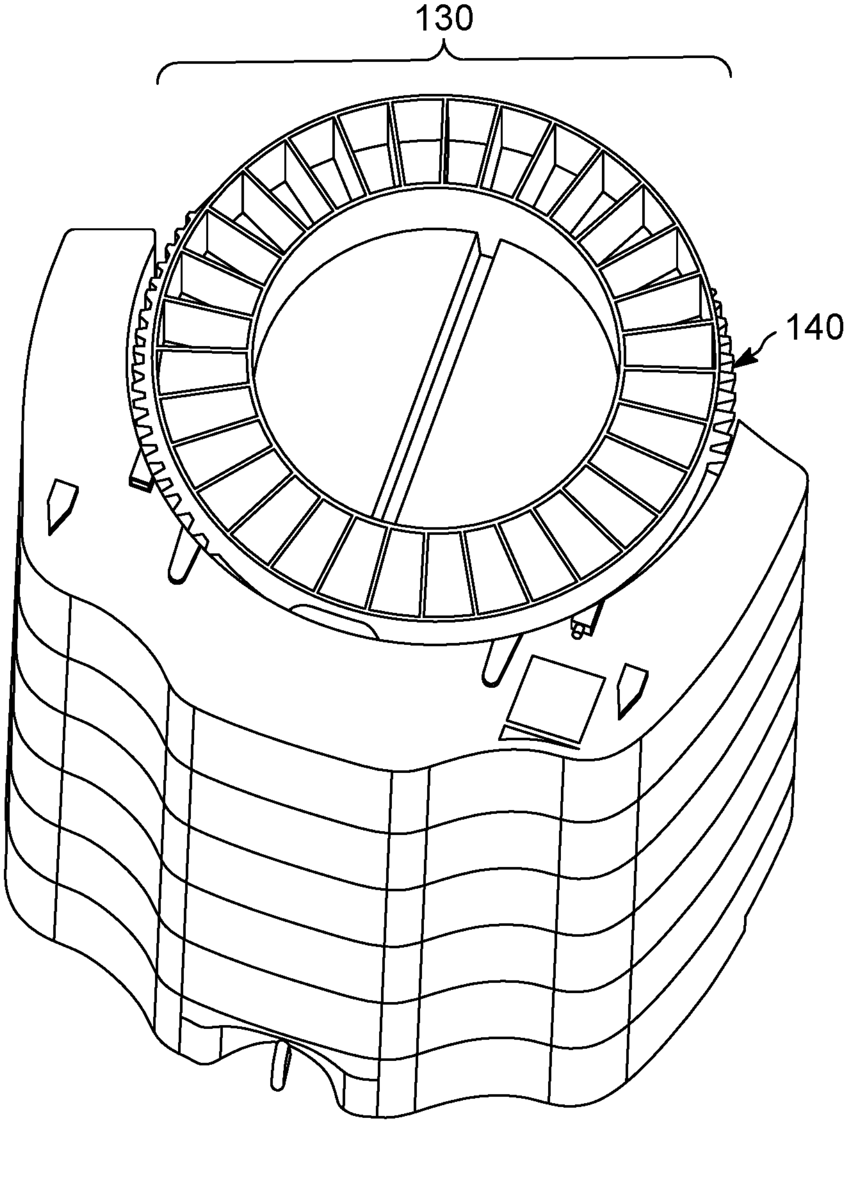
Figure 3:
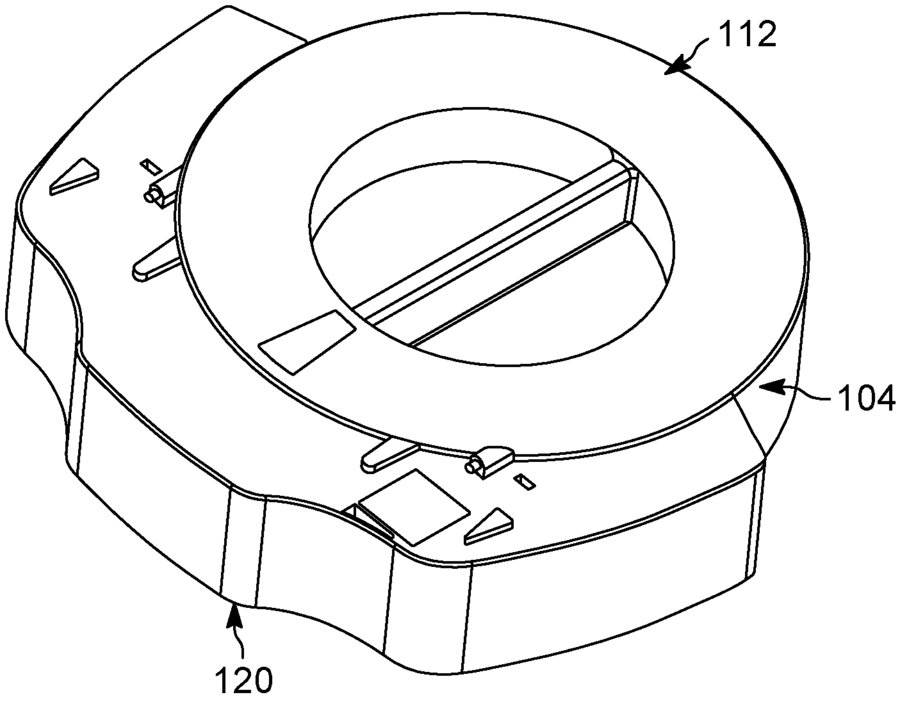

Referring to FIGS. 2*a*, 2*b* and 3, the after the top plate 102, the pill dispenser 100 comprises of the combination of the cartridge assembly 120 and the cartridges 104, wherein the cartridge 104 is covered with a lid 112. The lid 112 has to be manually twisted in a clockwise direction and pulled upwards to open up the pill tray 140.

The pill tray 140 comprises slots 130 filled with pill.

In an embodiment, the slots 130 are configured to place a pill and a pill dispensing slot for dispensing the pill.

In another embodiment, each cartridge 104 has up to 31 (one slot each as per the days in a month on an average) slots 130, that can fill up to 25 pills in one slot 130. In yet another embodiment, the pills can be filled in alternate slots also, if required.

In an embodiment, the pill tray 140 rotate at a pre-determined time to align with the pill dispensing slot.

The lid 112 comprises a pill dispensing slot cover 114 which has to be manually pushed inside to break and uncover the pill dispensing slot.

In an embodiment, the cartridge assembly 120 comprises a connector 116 configured to provide power and data supply to the pill dispenser and at least one motor 128 configured to rotate the pill tray 140 to align next filled slot to the pill dispensing slot for the pill to dispense.

In an embodiment, the pill tray 140 automatically rotates in the cartridge 104 at 11.25 degree each.

In another embodiment, the cartridge assembly 120 includes a set of grooves 118 to attach the cartridge 104.

The pharmacist fixes a particular sequence of cartridges 104 when stacking the pre-filled cartridge 104. At the time when the pill tray 140 is empty, the application sends notifications for new cartridge 104 to be inserted after ejecting the old.

The consumer presses the eject button the application and the existing cartridge 104 to be replaced is ejected.

A new pre-filled cartridge 104 comprises a visual code pasted on the external side. The visual code is selected from the group consisting of a QR code, an RFID code and a bar code.

The top plate 102 further includes a scanning unit comprising an image capturing unit and a scanner. The consumer scans the visual code of the new cartridge 104 by the scanning unit. Once authenticated by a remote server, an authentication message is displayed along with the sequence of insertion. For example, a new cartridge is pre-programmed to be inserted at 2nd sequence so it will not be inserted at the 3rd sequence.

Figure 4A:
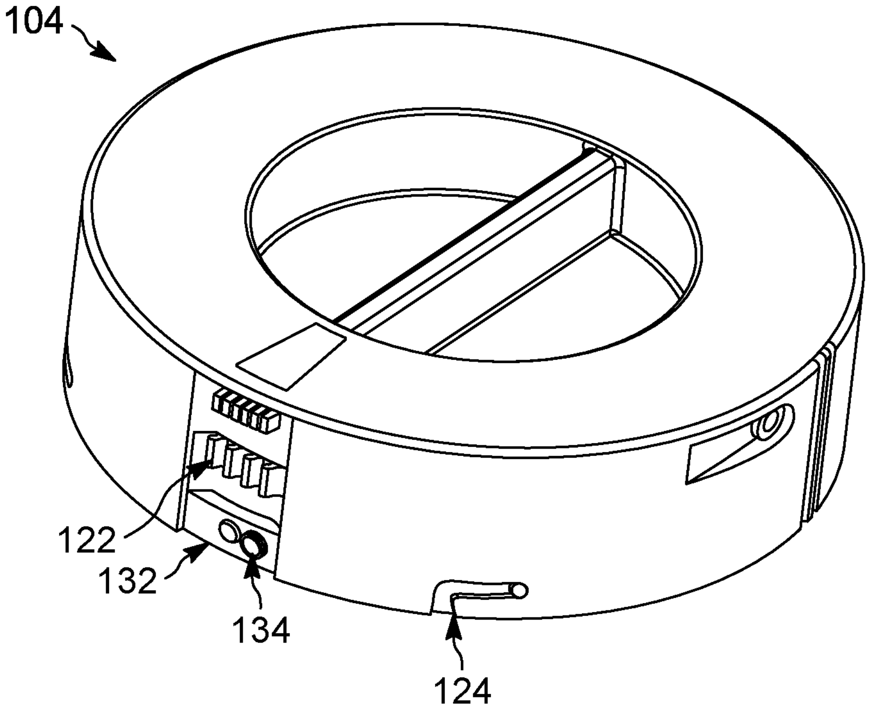
Figure 4B:
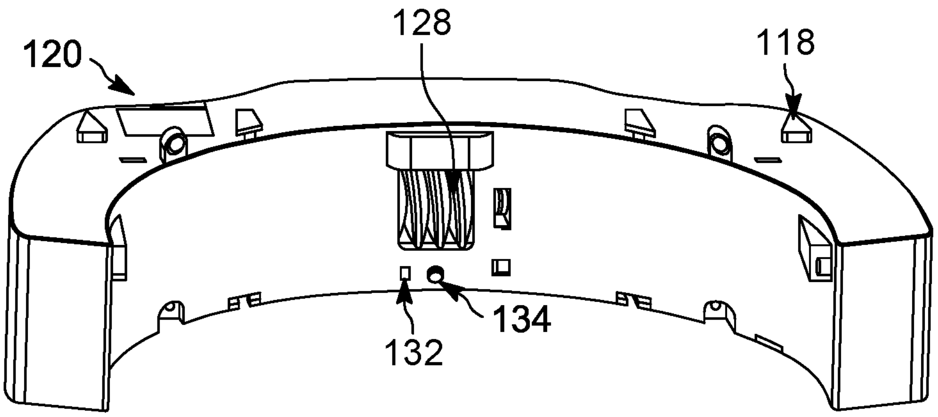

In case of exception, referring to FIGS. 4*a* and 4*b*, the tabs 122 are attached externally to each of the cartridge 104 wherein one of the tabs 122 remains intact and rest each of the tabs 122 are broken to create at least one hole to denote a serial number of the cartridge 104 to follow a sequence of mounting the cartridge 104.

The cartridge assembly comprises a plurality of magnets 134 and plurality of sensors 132. The magnets 134 are configured to hold the cartridge 104 in place in the cartridge assembly 120. The sensors 132 are configured to sense the proximity of the cartridge 104 fitted in the cartridge assembly 120.

Figure 5A:
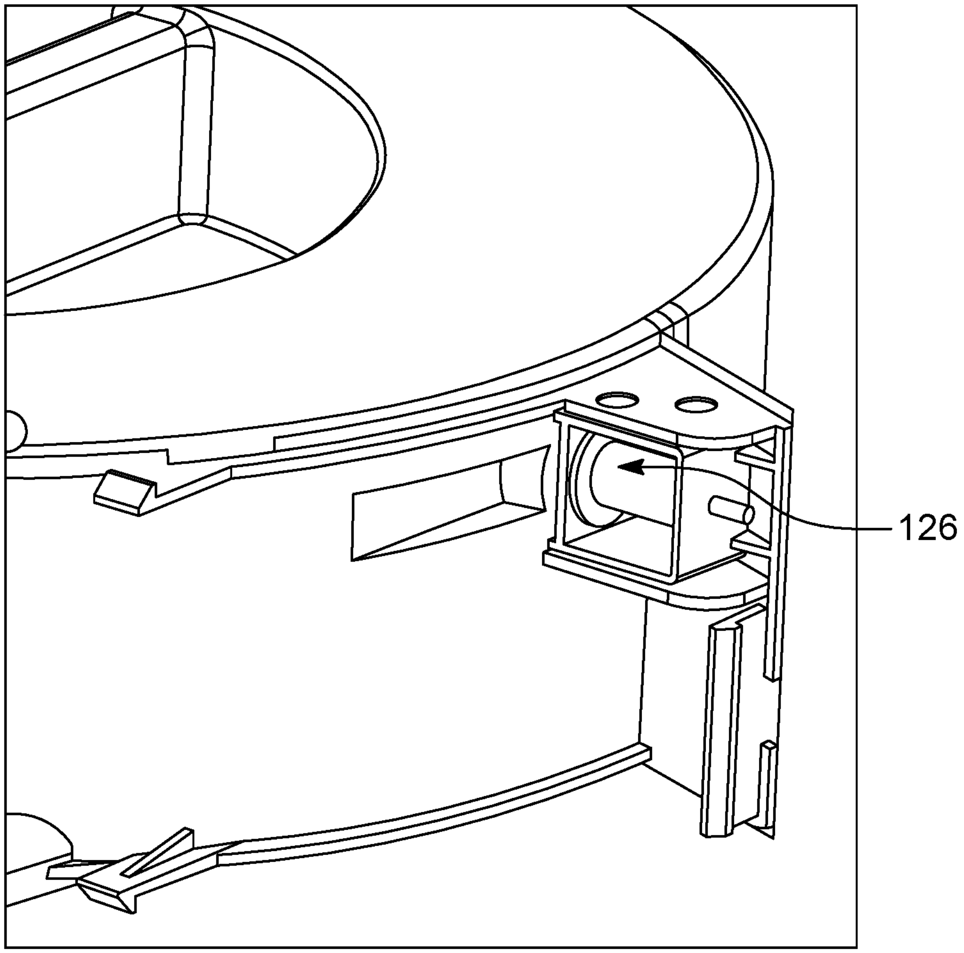
Figure 5B:
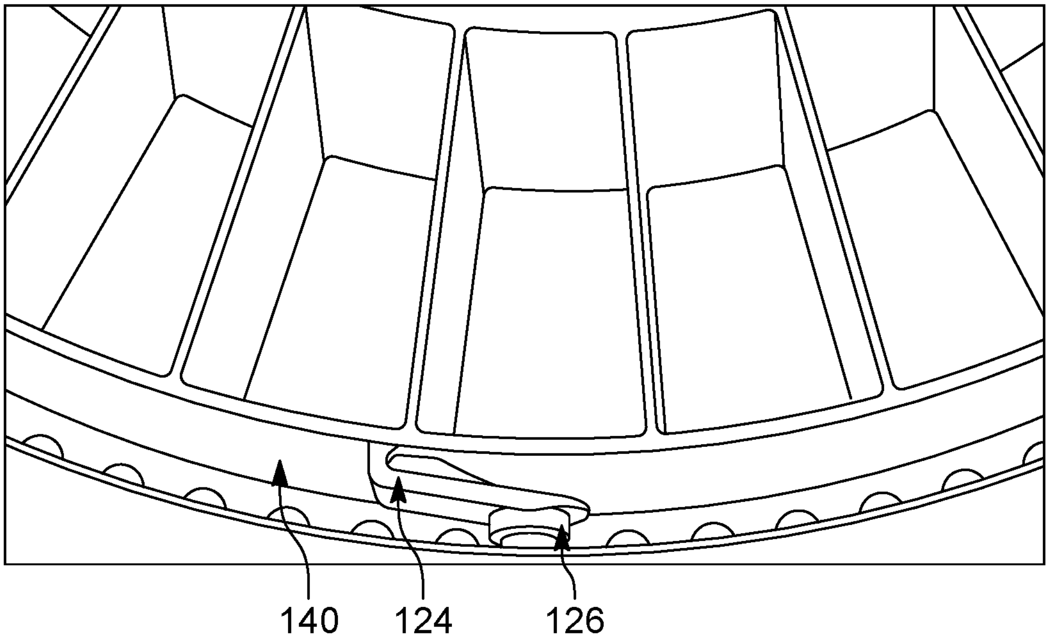

The cartridge 104 fits into the cartridge assembly 120 with the help of a lock 126 to hold by interlocking with a L shaped spring 124 on push of the cartridge, as referred in FIGS. 5*a* and 5*b*.

Figure 6:
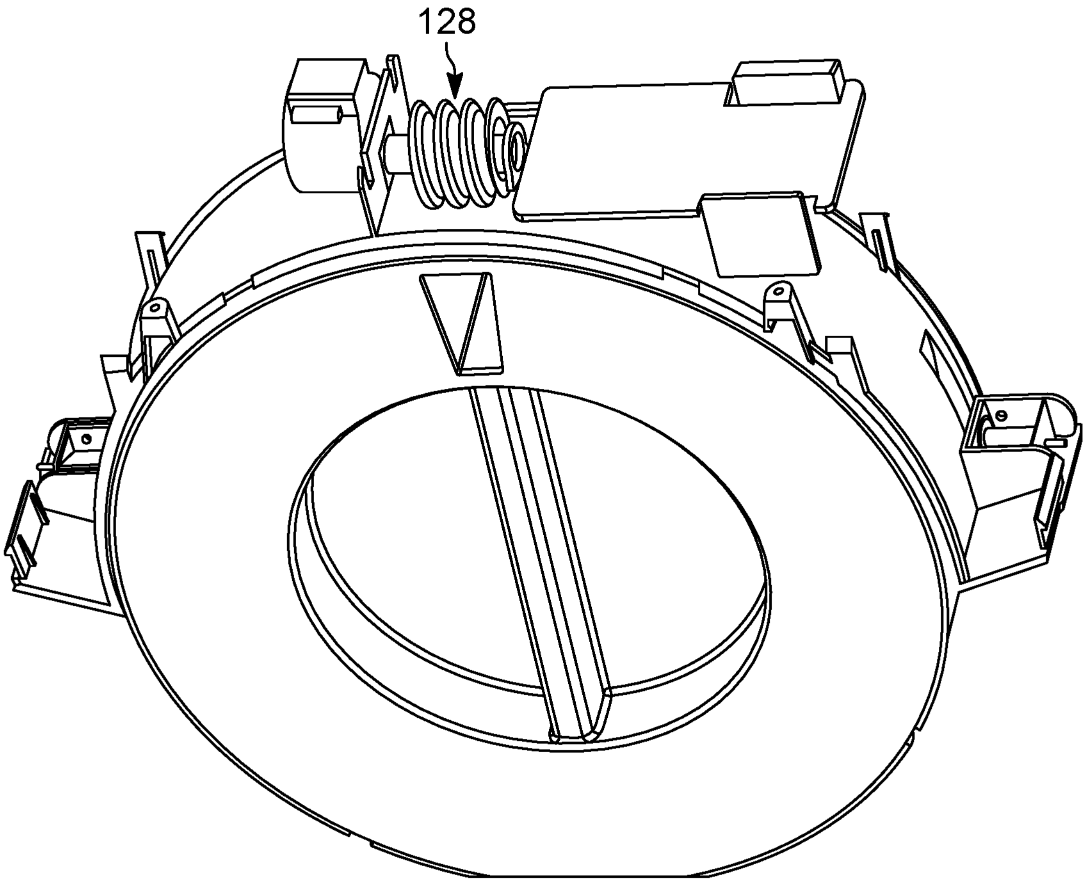
FIG. 6 illustrates the rear view of the base plate, in accordance with an embodiment of the present disclosure.

Each of the cartridge assembly 120 includes motor 128, referring to FIG. 6, for rotating of the pill tray 140.

Figure 7A:
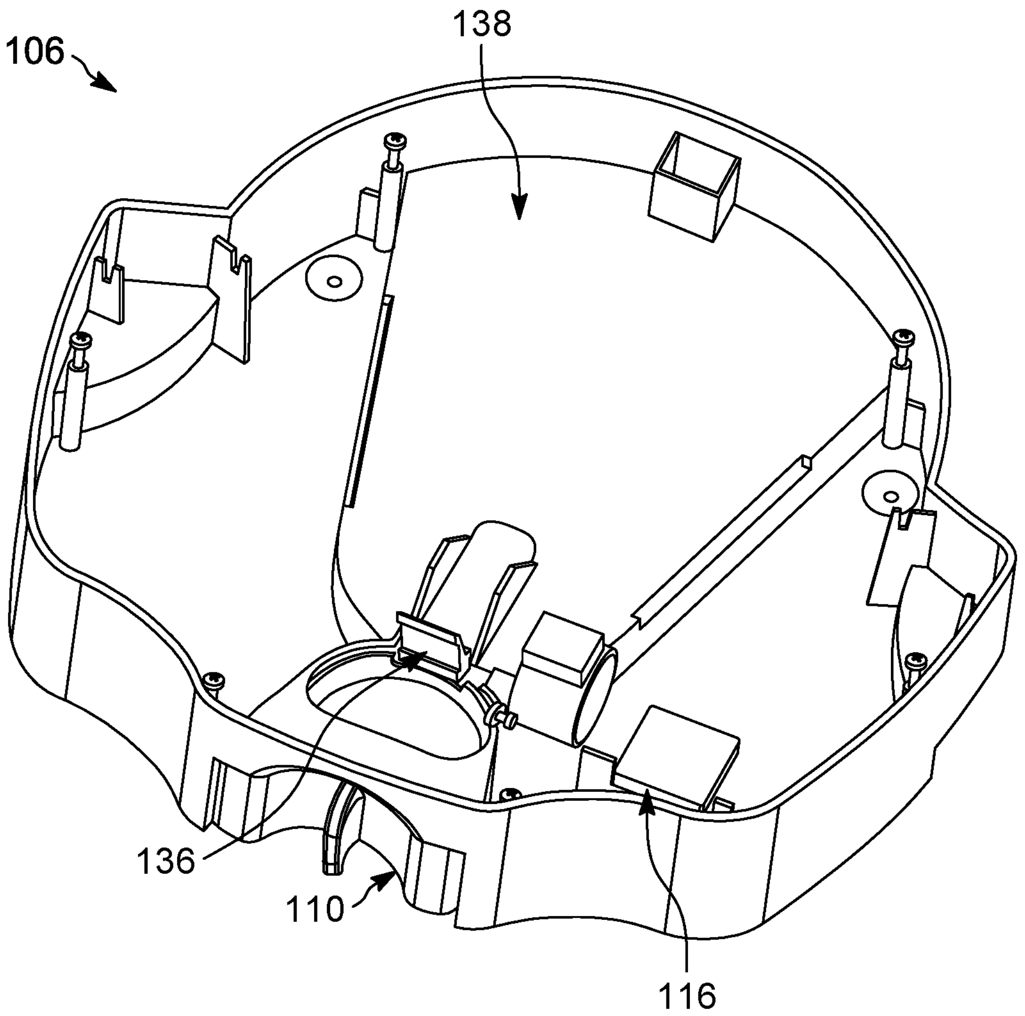
FIGS. 7*a*-7*c* illustrates the different view of the base plate, in accordance with an embodiment of the present disclosure.
Figure 7B:
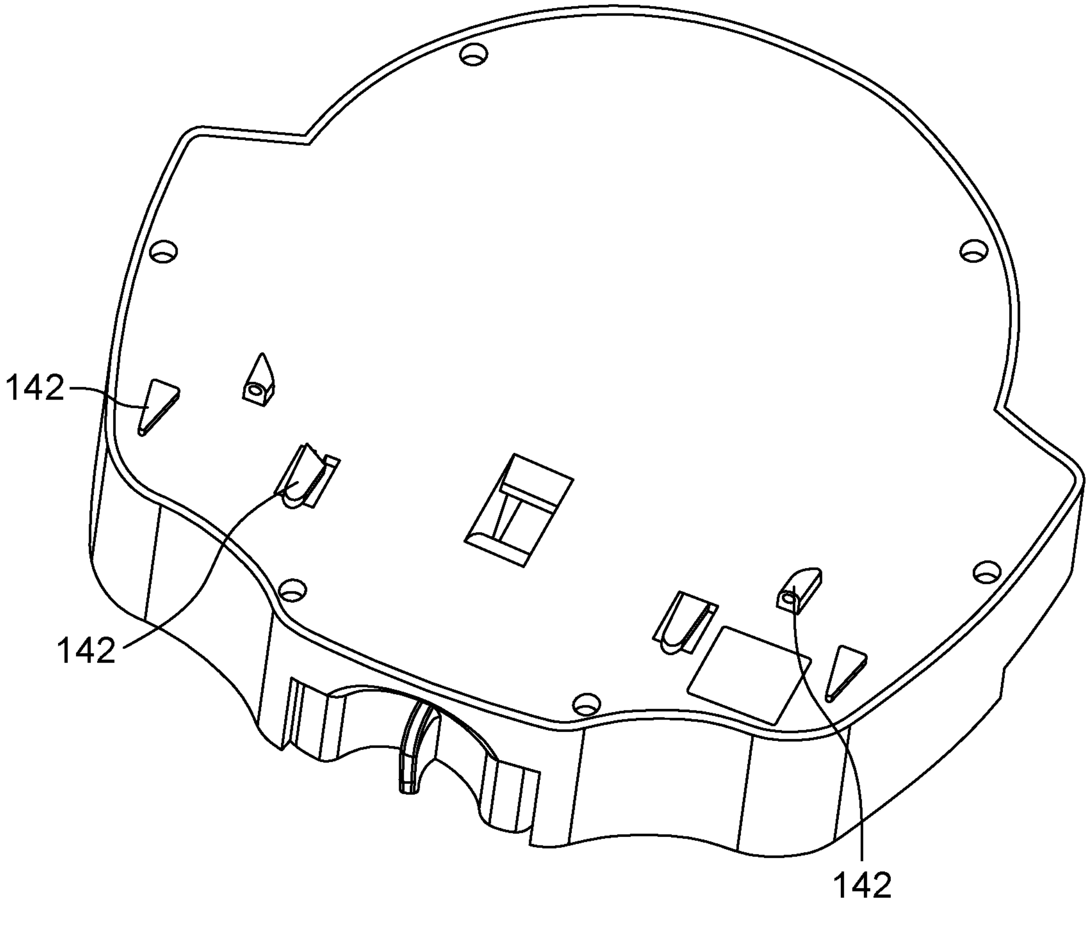
Figure 7C:
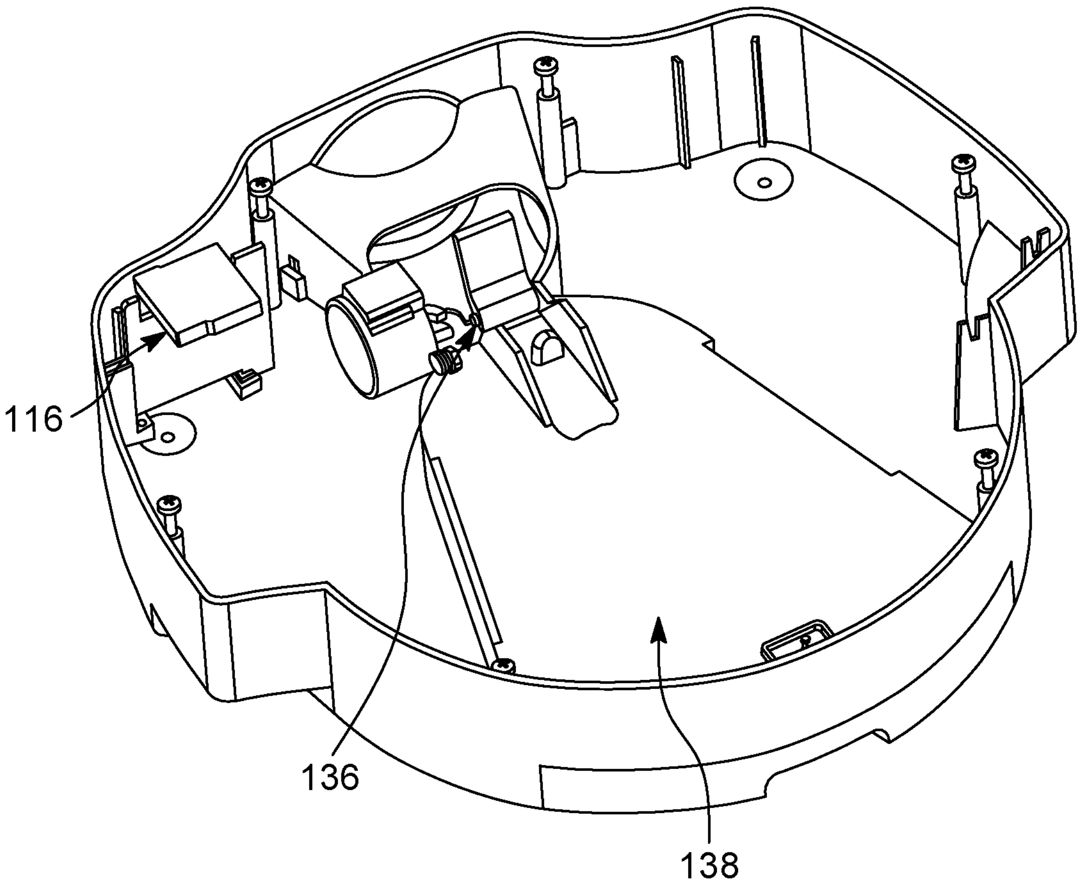
Figure 8:
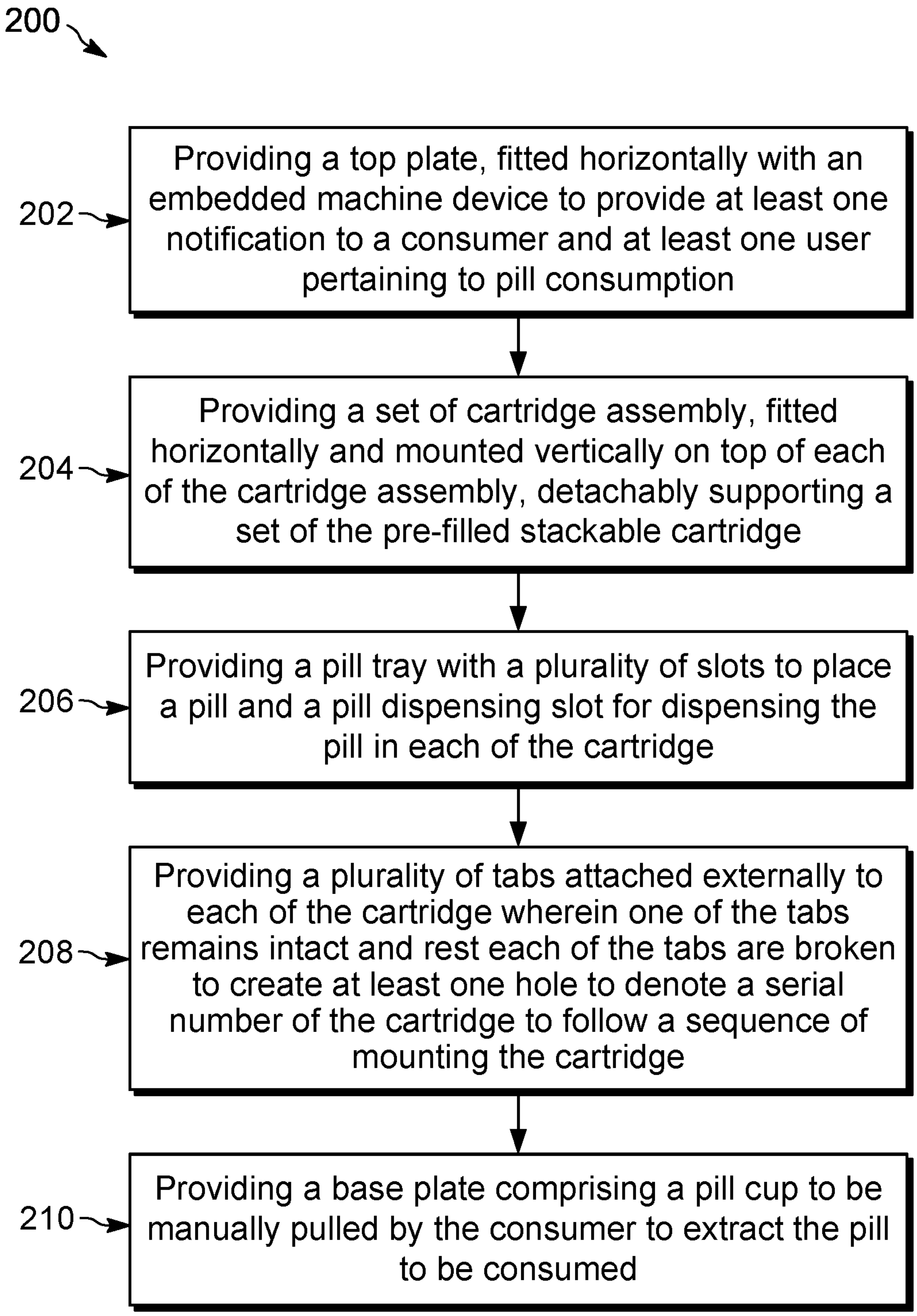
FIG. 8 illustrates a flow diagram depicting the method steps to implement the pill dispenser with a pre-filled stackable cartridge of FIG. 1, in accordance with an embodiment of the present disclosure.

Referring to FIGS. 7*a*, 7*b* and 7*c*, the base plate 106 comprising a pill cup 110 to be manually pulled by the consumer to extract the pill to be consumed.

The consumer receives or hears the messages to take the next timed pill. The consumer presses the dispense button on the machine device 108. The pill for particular time and day is dispensed accordingly and falls into the pill cup 110. The consumer pulls the pill cup 110 and manually extract the pill.

In an embodiment, the pill cup 110 can be fully ejected so that the consumer can directly consume the pills or manually pick the pills, as per the convenience.

The base plate 106 comprises a gate configured to flip to one side after a pre-determined time to collect the pill by a trash pan 138 if the pill cup 110 is not ejected for extracting the pill. In an embodiment, the trash pan 138 can be physically opened by a pharmacist/caregiver/relative of the consumer for discarding of the unused pills.

In case, the consumer forgets to take pill and do not press the dispense button, the pill is automatically dispensed after a pre-determined time, a switch 136 is flipped on one side and the pill is collected in a trash pan 138.

In an embodiment, the consumer, caregivers and the pharmacist receives notification and reminders about the missed dose, and logs are maintained of the missed dose.

In an embodiment, the base plate 106 comprises a plurality of magnets 134 to hold the pill cup and at least one sensor 132 to sense proximity of the pill cup and send a signal to the machine device 108 if the cup 110 is not correctly placed.

In an embodiment, there are a plurality of pins 142 to support the base plate 106.

In an embodiment, the pill dispenser 100 is made of ABS plastic, glass mixed nylon and polycarbonate.

In an embodiment, each of the cartridge 104 has a pill tray 140. The pill dispensing slot cover 114 has to be pushed and break for each of the lid 112 for the pill to be dispensed. The pill tray 140 rotates to be aligned to the pill dispensing slot (empty slot) for the pill to dispense through all the pill trays 140.

For example, the cartridges 104 are set in the sequence of time of the days i.e., morning, afternoon, evening and night, in the ascending order then the night time pill cartridge 104 will be at the top and last will be morning pill cartridge 104. At the time of night pill to be dispensed, the pill will be dispensed from the pill dispensing slot of the night pill cartridge, evening pill cartridge, afternoon pill cartridge and the morning pill cartridge. The pill will either fall into the pill cup 110 or fall into the trash pan 138.

In an embodiment, the pill dispenser 100 provides biometric authentication for dispensing the pills to the rightful consumer.

In another embodiment, the pill dispenser 100 comprise a wearable device communicatively coupled with the pill dispenser 100 for facilitating the consumer to dispense the pill.

In yet another embodiment, the pill dispenser 100 provides a physical SOS device with a button to be pushed by the consumer in case of emergencies, in addition to the SOS button in the machine device 108 (described above) for providing better and more security.

In an embodiment, the pill dispenser 100 is easily carried by the consumer, has battery backup, easily powered, and has a switch ON/OFF button.

The present disclosure also envisages aspects relating to a method 200 for operation of a pill dispenser with a pre-filled stackable cartridge.

The steps comprise:

providing a top plate, fitted horizontally with an embedded machine device to provide at least one notification to a consumer and at least one user pertaining to pill consumption;

providing a set of cartridge assembly, fitted horizontally and mounted vertically on top of each of the cartridge assembly, detachably supporting a set of the pre-filled stackable cartridge;

providing a pill tray with a plurality of slots to place a pill and a pill dispensing slot for dispensing the pill in each of the cartridge;

providing a plurality of tabs attached externally to each of the cartridge wherein one of the tabs remains intact and rest each of the tabs are broken to create at least one hole to denote a serial number of the cartridge to follow a sequence of mounting the cartridge; and providing a base plate comprising a pill cup to be manually pulled by the consumer to extract the pill to be consumed.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure described herein above has several technical advantages including, but not limited to, the realization of a pill dispenser with a pre-filled stackable cartridge that: is secure, child proof and tamper resistant, provides automatic tracking of all doses, even upcoming, provides medication reminders if required for both consumers and caregivers, is a hassle free and an error free device as it is pre-filled by a pharmacist, provides proper management of unused medications, and provides authenticated verification, to put pre-filled cartridges once the earlier are empty.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A pill dispenser, comprising:

a pre-filled stackable cartridge that comprises:

a top plate, fitted horizontally with an embedded machine device to provide at least one notification to a consumer and at least one user pertaining to pill consumption;

a set of cartridge assembly, fitted horizontally and mounted vertically on top of each of said cartridge assembly, detachably supporting a set of said pre-filled stackable cartridge wherein each of said cartridge comprise:

a pill tray with a plurality of slots configured to place one or more pills that comprise a dose and a pill dispensing slot for dispensing said one or more pills; and a plurality of tabs, attached externally to each of said cartridge wherein one of said tab remains intact and rest each of said tabs are broken to create at least one hole to denote a serial number of said cartridge to follow a sequence of mounting said cartridge, a base plate comprising a pill cup to be manually pulled by said consumer to extract said one or more pills to be consumed.

2. The pill dispenser as claimed in claim 1, wherein said cartridge assembly includes a lock to hold said cartridge in place by interlocking with a L shaped spring on push of said cartridge.

3. The pill dispenser as claimed in claim 1, wherein said cartridge assembly comprises:

a connector configured to provide power and data supply to said pill dispenser; and at least one motor configured to rotate said cartridge to align next filled slot to said pill dispensing slot for said pill to dispense.

4. The pill dispenser as claimed in claim 1, wherein said base plate comprises a plurality of magnets to hold said pill cup and at least one sensor to sense proximity of said pill cup and send a signal to said machine device if said cup is not correctly placed.

5. The pill dispenser as claimed in claim 1, wherein said base plate comprises a gate configured to flip to one side after a pre-determined time to collect said pill by a trash pan.

6. The pill dispenser as claimed in claim 1, wherein the number of said cartridges can be increased or decreased accordingly.

7. The pill dispenser as claimed in claim 1, wherein said pill tray rotate at a pre-determined time to align with said pill dispensing slot.

8. The pill dispenser as claimed in claim 1, wherein said machine device comprises a user interface to facilitate said consumer to provide at least one input to select at least one functionality, an application and a scanning unit.

9. The pill dispenser as claimed in claim 8, wherein said application is configured to provide said notification to said user.

10. The pill dispenser as claimed in claim 8, wherein said scanning unit is configured to scan at least one visual code pasted on a new cartridge to be fitted in said cartridge assembly once said cartridge is ejected.

11. A method of operation of a pill dispenser with a pre-filled stackable cartridge, said method comprises the steps of:

providing a top plate, fitted horizontally with an embedded machine device to provide at least one notification to a consumer and at least one user pertaining to pill consumption;

providing a cartridge assembly, fitted horizontally and mounted vertically on top of each of said cartridge assembly, detachably supporting a set of said pre-filled stackable cartridge;

providing a plurality of slots to place a pill and a pill dispensing slot for dispensing said pill in each of said cartridge;

providing a plurality of tabs attached externally to each of said cartridge wherein one of said tab remains intact and rest each of said tabs are broken to create at least one hole to denote a serial number of said cartridge to follow a sequence of mounting said cartridge; and providing a base plate comprising a pill cup to be manually pulled by said consumer to extract said pill to be consumed.

* * * * *